(12) United States Patent
Jansen et al.

(10) Patent No.: US 12,024,001 B2
(45) Date of Patent: Jul. 2, 2024

(54) SUNSHADE SYSTEM AND METHOD OF MANUFACTURING PARTS THEREOF

(71) Applicant: Inalfa Roof Systems Group B.V., Oostrum (NL)

(72) Inventors: Carolus Theodorus Wilhelmus Petrus Jansen, Vierlingsbeek (NL); Petrus Marinus Josephus Clephas, Sevenum (NL); Dirk Cornelis Dionisius Maria Van Oirschot, Venray (NL)

(73) Assignee: INALFA ROOF SYSTEMS GROUP B.V., Oostrum (NL)

( * ) Notice: Subject to any disclaimer, the term of this patent is extended or adjusted under 35 U.S.C. 154(b) by 649 days.

(21) Appl. No.: 17/000,968

(22) Filed: Aug. 24, 2020

(65) Prior Publication Data

US 2021/0061077 A1 Mar. 4, 2021

(30) Foreign Application Priority Data

Aug. 27, 2019 (EP) ..................................... 19193828

(51) Int. Cl.
*B60J 7/06* (2006.01)
*B29C 53/04* (2006.01)
(Continued)

(52) U.S. Cl.
CPC ............. *B60J 7/067* (2013.01); *B29C 53/043* (2013.01); *B29C 53/84* (2013.01); *B60J 7/0023* (2013.01)

(58) Field of Classification Search
CPC ...... B60J 1/2044; B60J 7/0046; B60J 7/0435; B60J 1/2041; B60J 1/2052; B60J 7/0015; E06B 9/58; E06B 9/581
See application file for complete search history.

(56) References Cited

U.S. PATENT DOCUMENTS

| | | |
|---|---|---|
| 1,370,500 A | 3/1921 | Jones |
| 1,459,155 A | 6/1923 | Ioor |
| | (Continued) | |

FOREIGN PATENT DOCUMENTS

| | | |
|---|---|---|
| CH | 473962 A | 6/1969 |
| CN | 2700152 Y | 5/2005 |
| | (Continued) | |

OTHER PUBLICATIONS

European Search Report dated Apr. 15, 2020, for corresponding European Patent Application No. 19193828.1.

*Primary Examiner* — Abe Massad
(74) *Attorney, Agent, or Firm* — Steven M. Koehler; Westman, Champlin & Koehler, P.A.

(57) ABSTRACT

Sunshade system for a vehicle roof assembly, comprising a flexible sunscreen having at least a main part with two opposite lateral edges with guiding strips attached thereto. Each guiding strip comprises inwardly foldable parts foldable inwardly towards a centerline of the sunshade in an acute angle with the main part of the guiding strips and being folded flat in the same plane as the main part when the sunscreen is wound on the shaft. A foldable first hinge part extends in longitudinal direction of said strip formed as a depression. Two opposed longitudinal guides are provided with locking members and with guide chambers for engaging the inwardly foldable part of the flexible sunscreen. Each guiding strip is made of thermoplastic material and comprises at least a second hinge part extending parallel to the first hinge part, longitudinally along the guiding strip.

16 Claims, 11 Drawing Sheets

(51) Int. Cl.
  *B29C 53/84* (2006.01)
  *B60J 7/00* (2006.01)

(56) References Cited

U.S. PATENT DOCUMENTS

| | | | |
|---|---|---|---|
| 1,673,326 A | 6/1928 | Goldsmith | |
| 1,815,551 A | 7/1931 | Dunn | |
| 1,893,351 A | 1/1933 | Austin | |
| 2,210,590 A | 8/1940 | Jobst | |
| 2,720,948 A | 10/1955 | Pajak | |
| 3,017,927 A | 1/1962 | Demko | |
| 3,116,097 A | 12/1963 | Novales | |
| 4,407,541 A | 10/1983 | Boots | |
| 4,602,815 A | 7/1986 | Boots et al. | |
| 4,610,293 A | 9/1986 | Weiblen | |
| 4,647,106 A | 3/1987 | Furst | |
| 4,649,981 A | 3/1987 | Bibeau | |
| 4,709,959 A | 12/1987 | Paerisch et al. | |
| 4,798,410 A | 1/1989 | Weller et al. | |
| 4,807,921 A | 2/1989 | Champie, III et al. | |
| 4,825,921 A | 5/1989 | Rigter | |
| 4,877,285 A | 10/1989 | Huyer | |
| 4,911,497 A | 3/1990 | Schreiter et al. | |
| 4,987,943 A | 1/1991 | Charest | |
| 4,995,667 A | 2/1991 | Tamura et al. | |
| 4,996,095 A | 2/1991 | Behdorf et al. | |
| 5,058,947 A | 10/1991 | Huyer | |
| 5,117,892 A | 6/1992 | Murray | |
| 5,163,495 A * | 11/1992 | Lichy | E06B 9/58 |
| | | | 160/271 |
| 5,259,662 A | 11/1993 | Huyer | |
| 5,288,125 A | 2/1994 | Huyer | |
| 5,392,836 A | 2/1995 | West et al. | |
| 5,451,091 A | 9/1995 | Schleicher | |
| 5,484,184 A | 1/1996 | Kohlpaintner et al. | |
| 5,524,406 A | 6/1996 | Ragland | |
| 5,526,865 A | 6/1996 | Coenraets | |
| 5,579,820 A | 12/1996 | LePage et al. | |
| 5,746,475 A | 5/1998 | Caye et al. | |
| 5,765,908 A | 6/1998 | Kelm | |
| 5,934,353 A | 8/1999 | Buhr | |
| 5,971,473 A | 10/1999 | Kelm | |
| 6,012,768 A | 1/2000 | Nabuurs et al. | |
| 6,030,031 A | 2/2000 | Martinus Lenkens | |
| 6,119,758 A | 9/2000 | Coenraets | |
| 6,129,413 A | 10/2000 | Klein | |
| 6,179,373 B1 | 1/2001 | Bohm et al. | |
| 6,199,944 B1 | 3/2001 | Lee et al. | |
| 6,390,545 B1 | 5/2002 | Makino et al. | |
| 6,394,173 B2 | 5/2002 | Enssle | |
| 6,454,347 B2 | 9/2002 | Lee et al. | |
| 6,457,769 B2 | 10/2002 | Hertel et al. | |
| 6,527,337 B2 | 3/2003 | Farber | |
| 6,691,761 B1 | 2/2004 | Alkhoury et al. | |
| 6,776,211 B2 | 8/2004 | Schlecht et al. | |
| 6,899,380 B2 | 5/2005 | Kralik et al. | |
| 6,942,003 B2 | 9/2005 | Thompson | |
| 6,957,850 B2 | 10/2005 | Breuer et al. | |
| 6,968,887 B2 | 11/2005 | Hansen et al. | |
| 6,991,761 B2 | 1/2006 | Hehenberger et al. | |
| 7,028,741 B2 | 4/2006 | Coenraets | |
| 7,051,781 B2 | 5/2006 | Grimm et al. | |
| 7,063,227 B2 | 6/2006 | Looker | |
| 7,114,766 B2 | 10/2006 | Becher et al. | |
| 7,114,767 B2 | 10/2006 | Grimm et al. | |
| 7,389,807 B2 | 6/2008 | Nagare et al. | |
| 7,516,770 B2 | 4/2009 | Jerry | |
| 7,744,151 B2 | 6/2010 | Jansen et al. | |
| 7,775,255 B2 | 8/2010 | Albert | |
| 7,793,702 B2 | 9/2010 | Biewer et al. | |
| 7,798,568 B2 | 9/2010 | Keller | |
| 7,850,231 B2 | 12/2010 | Ito et al. | |
| 7,862,109 B2 | 1/2011 | Geerets | |
| 7,950,440 B2 | 5/2011 | Rockelmann et al. | |
| 7,971,626 B2 | 7/2011 | Renz | |
| 8,118,356 B2 | 2/2012 | Holzel | |
| 8,136,872 B2 | 3/2012 | Nellen | |
| 8,220,868 B2 | 7/2012 | Fraley | |
| 8,474,510 B2 | 7/2013 | Nellen et al. | |
| 8,602,081 B2 | 12/2013 | Komatsu et al. | |
| 8,607,841 B2 | 12/2013 | Hayashiguchi | |
| 8,690,234 B2 | 4/2014 | Rockelmann et al. | |
| 8,770,258 B2 | 7/2014 | Kitani et al. | |
| 8,870,276 B2 | 10/2014 | Geurts et al. | |
| 8,955,575 B2 | 2/2015 | Glasl et al. | |
| 9,067,479 B2 | 6/2015 | Yukisada et al. | |
| 9,090,147 B2 | 7/2015 | Nellen et al. | |
| 9,108,491 B2 | 8/2015 | Zendath | |
| 9,227,489 B2 | 1/2016 | Farber | |
| 9,233,600 B2 | 1/2016 | Nellen et al. | |
| 9,358,861 B2 | 6/2016 | Rockelmann et al. | |
| 9,649,918 B2 | 5/2017 | Van Boxtel et al. | |
| 9,840,134 B2 | 12/2017 | Van Boxtel | |
| 10,132,117 B2 | 11/2018 | Munsters et al. | |
| 10,384,521 B2 | 8/2019 | Rockelmann et al. | |
| 2001/0019217 A1 | 9/2001 | Hertel et al. | |
| 2005/0045287 A1 | 3/2005 | Hansen et al. | |
| 2005/0218704 A1 | 10/2005 | Uehara et al. | |
| 2005/0225122 A1 | 10/2005 | Becher et al. | |
| 2005/0225123 A1 | 10/2005 | Grimm et al. | |
| 2006/0027347 A1 | 2/2006 | Boehm et al. | |
| 2006/0080903 A1 | 4/2006 | Grimm et al. | |
| 2007/0175603 A1 | 8/2007 | Lin | |
| 2007/0187977 A1 | 8/2007 | Mollick et al. | |
| 2007/0205636 A1 | 9/2007 | Gonzalez Merino et al. | |
| 2008/0036247 A1 | 2/2008 | Park | |
| 2008/0179021 A1 | 7/2008 | Biewer et al. | |
| 2008/0197655 A1 | 8/2008 | Derke et al. | |
| 2008/0216971 A1 | 9/2008 | Rockelmann et al. | |
| 2008/0277077 A1 | 11/2008 | Rockelmann et al. | |
| 2009/0014555 A1 | 1/2009 | Litvinov et al. | |
| 2009/0033113 A1 | 2/2009 | Albert | |
| 2009/0039682 A1 | 2/2009 | Ito et al. | |
| 2009/0072589 A1 | 3/2009 | Ito et al. | |
| 2009/0145559 A1 | 6/2009 | Glasl et al. | |
| 2009/0174217 A1 | 7/2009 | Lawall et al. | |
| 2009/0178771 A1 | 7/2009 | Lin | |
| 2010/0032991 A1 | 2/2010 | Keller | |
| 2010/0170645 A1 | 7/2010 | Lin | |
| 2011/0037295 A1 | 2/2011 | Nellen | |
| 2011/0056632 A1 | 3/2011 | Thalhammer et al. | |
| 2011/0146921 A1 | 6/2011 | Nellen et al. | |
| 2011/0226426 A1 | 9/2011 | Zendath | |
| 2011/0227371 A1 | 9/2011 | Nellen et al. | |
| 2012/0111511 A1 | 5/2012 | Kitani et al. | |
| 2013/0161983 A1 | 6/2013 | Geurts et al. | |
| 2014/0158313 A1 | 6/2014 | McTavish et al. | |
| 2014/0224436 A1 | 8/2014 | Yukisada et al. | |
| 2014/0319882 A1 | 10/2014 | Farber | |
| 2016/0130872 A1 | 5/2016 | Munsters et al. | |
| 2016/0221424 A1 | 8/2016 | Van Boxtel et al. | |
| 2016/0257184 A1 | 9/2016 | Van Boxtel | |
| 2017/0087966 A1 | 3/2017 | Umeki et al. | |
| 2017/0113522 A1 | 4/2017 | Rockelmann et al. | |
| 2017/0355249 A1* | 12/2017 | Kassler | B60J 1/2041 |
| 2019/0085627 A1 | 3/2019 | Munsters et al. | |
| 2019/0291546 A1* | 9/2019 | Ten-Jet-Foei | E06B 9/56 |
| 2019/0336801 A1* | 11/2019 | Edwards | E06B 9/17007 |

FOREIGN PATENT DOCUMENTS

| | | |
|---|---|---|
| CN | 1721216 A | 1/2006 |
| CN | 203318111 U | 12/2013 |
| DE | 3308065 A1 | 9/1983 |
| DE | 3536184 C1 | 11/1986 |
| DE | 4227400 A1 | 2/1994 |
| DE | 4321915 C1 | 7/1994 |
| DE | 4403163 C1 | 3/1995 |
| DE | 19639478 A1 | 7/1997 |
| DE | 19851366 A1 | 5/1999 |
| DE | 19929047 A1 | 11/1999 |
| DE | 19860826 A1 | 7/2000 |
| DE | 10019787 A1 | 10/2001 |
| DE | 10225360 C1 | 10/2003 |

(56) References Cited

FOREIGN PATENT DOCUMENTS

| | | |
|---|---|---|
| DE | 10230444 A1 | 1/2004 |
| DE | 10304506 A1 | 8/2004 |
| DE | 202004015857 U1 | 12/2004 |
| DE | 102004005754 A1 | 8/2005 |
| DE | 102004028882 A1 | 1/2006 |
| DE | 102005024657 A1 | 6/2006 |
| DE | 102005048207 B3 | 11/2006 |
| DE | 202006015107 U1 | 1/2007 |
| DE | 102005040758 A1 | 3/2007 |
| DE | 102006023813 A1 | 11/2007 |
| DE | 202007009971 U1 | 11/2007 |
| DE | 102008006344 B3 | 4/2009 |
| DE | 102008064054 A1 | 7/2009 |
| DE | 102011119991 B3 | 5/2012 |
| DE | 102012100298 B3 | 6/2013 |
| DE | 102015120318 A1 | 5/2017 |
| EP | 0292730 A2 | 11/1988 |
| EP | 0296644 A2 | 12/1988 |
| EP | 0331910 A2 | 9/1989 |
| EP | 0373692 A2 | 6/1990 |
| EP | 419985 A1 | 4/1991 |
| EP | 1112875 A2 | 7/2001 |
| EP | 1112876 A2 | 7/2001 |
| EP | 1145886 A1 | 10/2001 |
| EP | 1588880 A2 | 10/2005 |
| EP | 1616737 A1 | 1/2006 |
| EP | 1741588 A1 | 1/2007 |
| EP | 1953018 A1 | 8/2008 |
| EP | 2028031 A2 | 2/2009 |
| EP | 2151339 A1 | 2/2010 |
| EP | 2338716 A1 | 6/2011 |
| EP | 2450209 A2 | 5/2012 |
| EP | 3017985 A1 | 5/2016 |
| FR | 1378077 A | 11/1964 |
| FR | 1379077 A | 11/1964 |
| FR | 2750930 A1 | 1/1998 |
| GB | 2078295 A | 1/1982 |
| IN | 1915700 A | 2/2007 |
| JP | 59156820 A | 9/1984 |
| JP | H11141250 A | 5/1999 |
| WO | 2006053520 A2 | 5/2006 |
| WO | 2006060990 A1 | 6/2006 |
| WO | 2009026904 A1 | 3/2009 |
| WO | 2009109219 A1 | 9/2009 |
| WO | 2010022769 A1 | 3/2010 |
| WO | 2010063312 A1 | 6/2010 |
| WO | WO-2017207028 A1 * 12/2017 ............. B60J 1/203 |

* cited by examiner

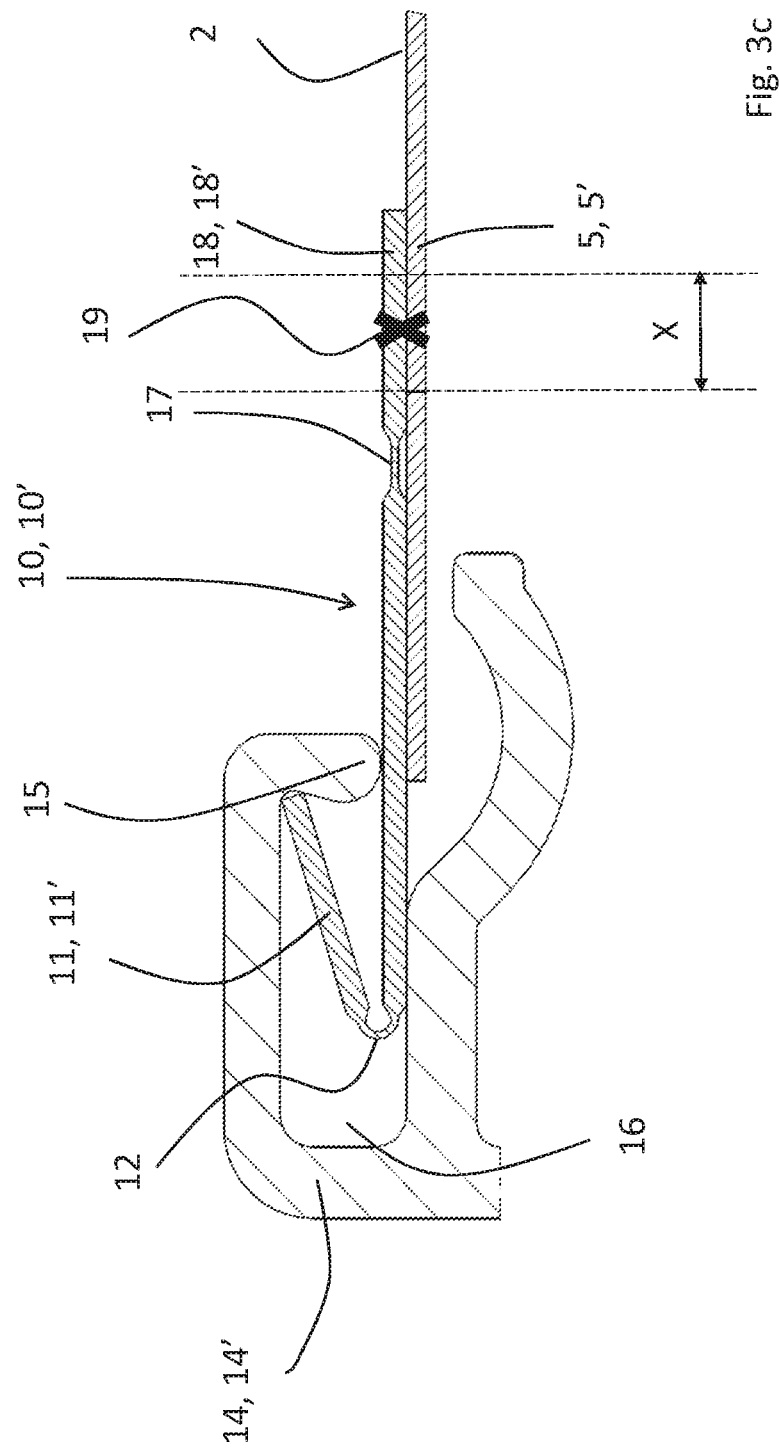

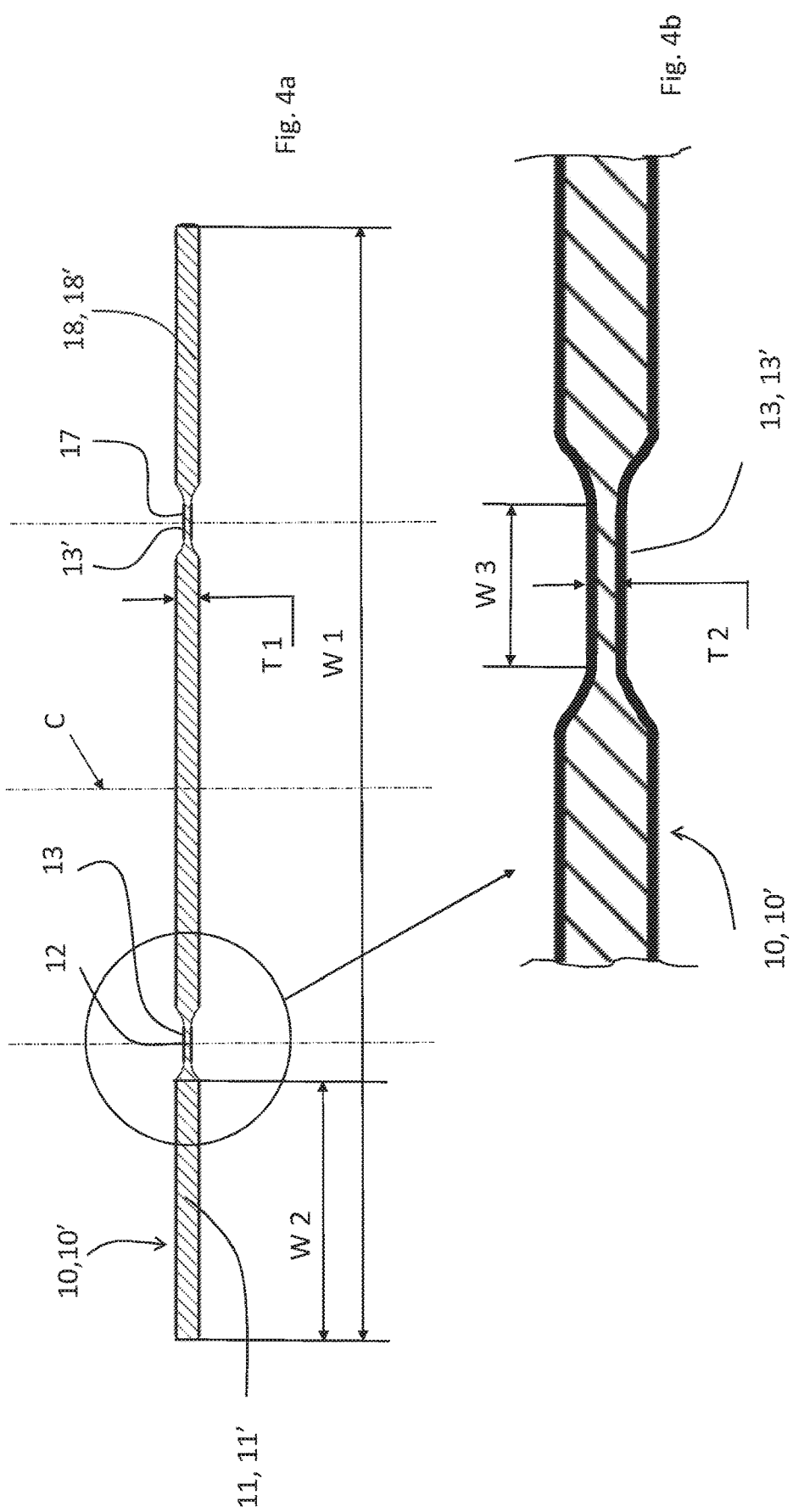

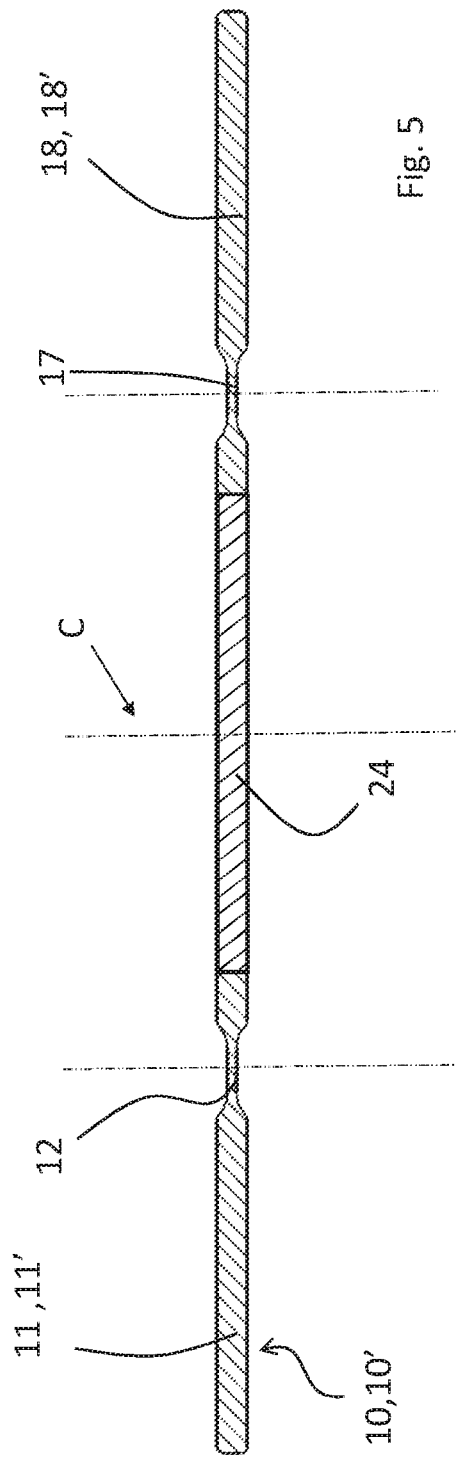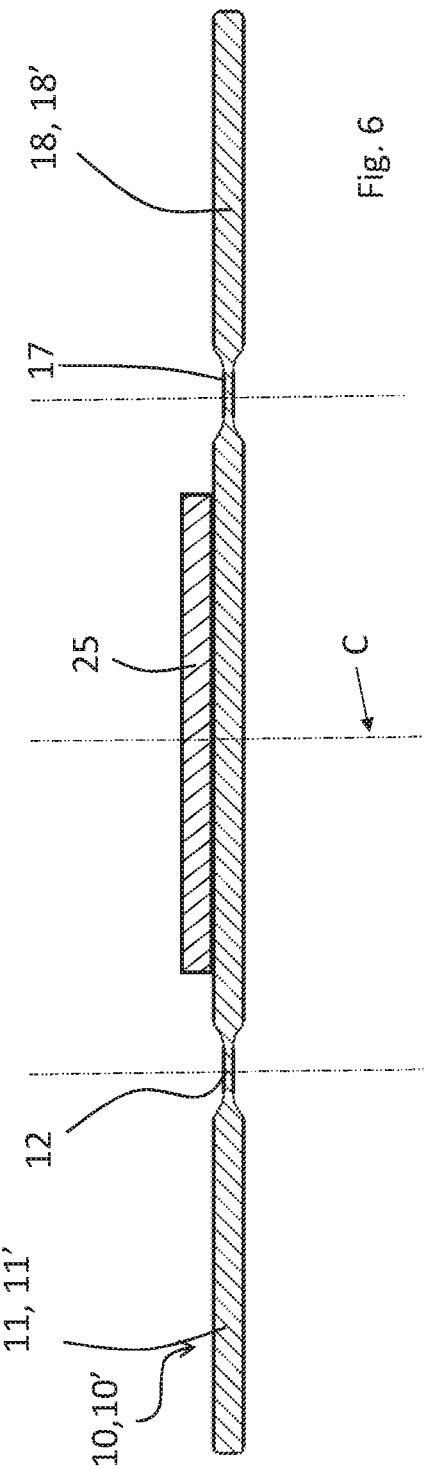

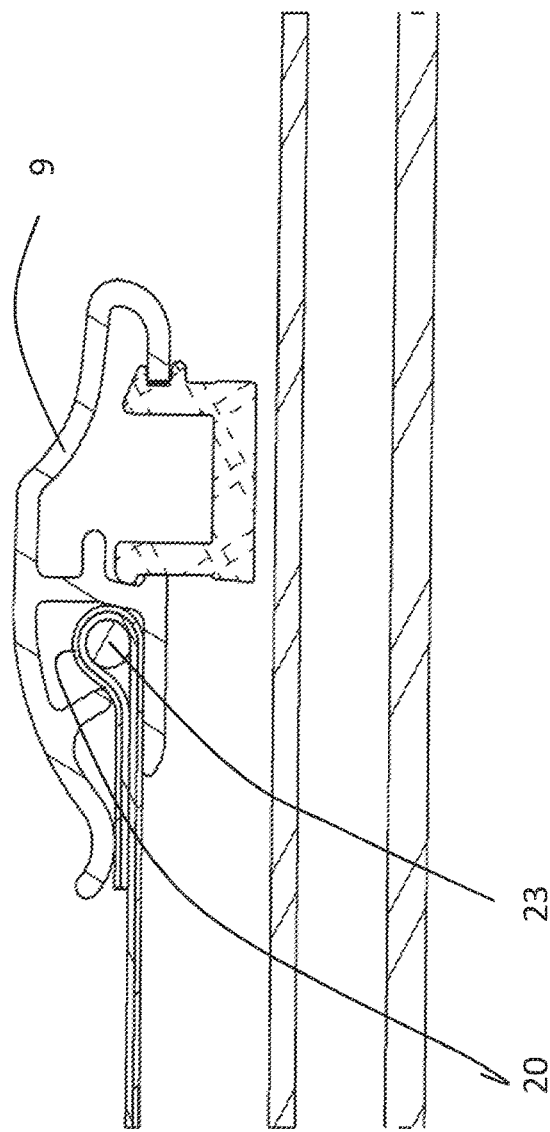
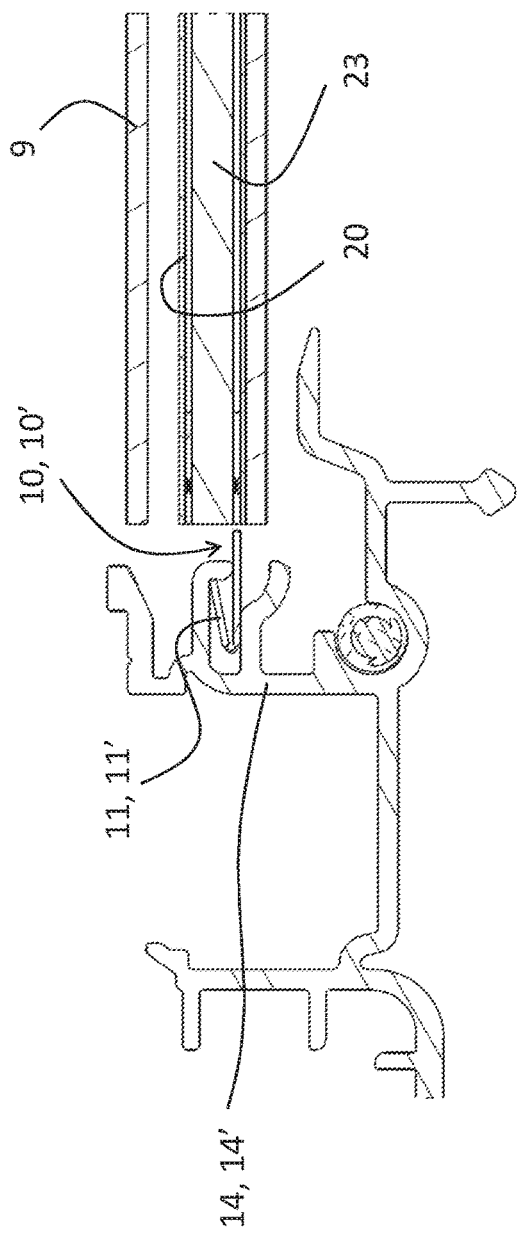

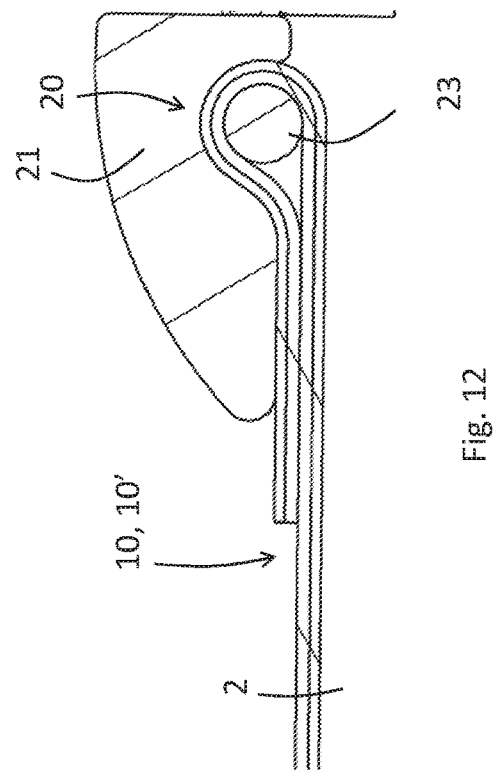
Fig. 12
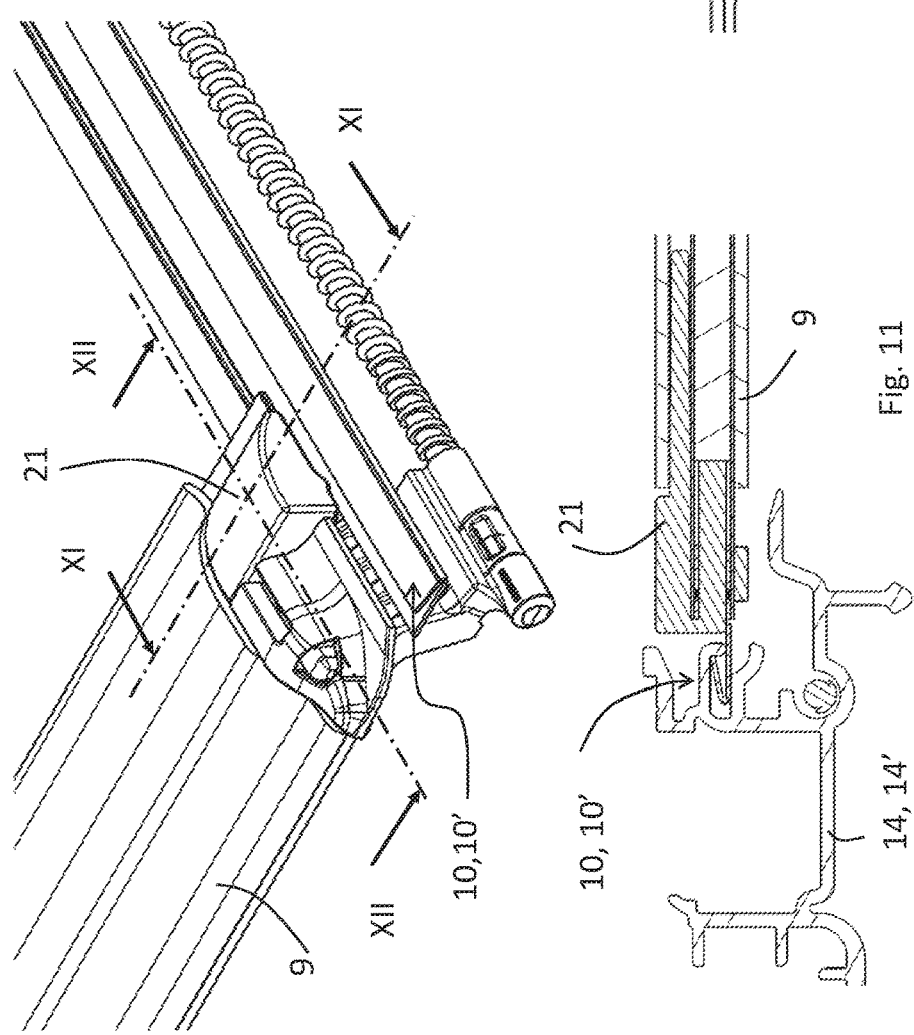
Fig. 10
Fig. 11

SUNSHADE SYSTEM AND METHOD OF MANUFACTURING PARTS THEREOF

BACKGROUND

The discussion below is merely provided for general background information and is not intended to be used as an aid in determining the scope of the claimed subject matter.

The invention relates to a sunshade system for use in a vehicle roof assembly, capable of opening or at least partly closing an opening below the vehicle roof assembly, said sunshade system comprising a flexible sunscreen having at least a main part with two opposite lateral side edges, a leading edge and a trailing edge, a winding shaft for winding and unwinding the flexible sunscreen at its trailing edge, an operating beam attached to the leading edge of the flexible sunscreen guiding strips laterally extending along, and attached to, each of lateral side edges of the main part and each of the guiding strips comprising inwardly foldable parts capable of being folded inwardly towards a longitudinal centerline of the sunshade system, in an acute angle with the main part of the guiding strips and being folded flat in the same plane as the main part when the flexible sunscreen is wound up on to the winding shaft and a foldable first hinge part extending in longitudinal direction of said strips, whereby the first hinge part is formed as a depression made in the guiding strips and whereby each inwardly foldable part is connected to the main part of the guiding strips by said first hinge part and two opposed longitudinal guides for retaining therein in a transverse direction and slidably guiding therein in a longitudinal direction, at least the inwardly foldable parts, and a part of the main part of the guiding strips, said guides being provided with locking members and with guide chambers for engaging at least the inwardly foldable part of the flexible sunscreen for preventing said inwardly foldable parts from laterally moving out of the longitudinal guides when the flexible sunscreen is at least partly unwound.

Such a sunshade system is known in the art and may be equipped with a flexible sunscreen having certain properties of the flexible cloth like material. In case the guiding strips of such systems are designed such that the cloth like material is part of the guiding strips, the performance of the guiding strips depends to a large extent on the properties of the cloth like material. So it may happen that the properties of a lightweight semi-transparent cloth like material is much different from a relative thick and heavy cloth material. This causes differences in performances from one type of cloth material to another type, which is undesirable. For example negative influences in performance, such as sliding performance of the guiding strips through the guiding channels of the guides or negative influences in noises while winding or unwinding the flexible sunscreen system. In case of thick and heavy cloth, it may happen that the cloth seen in a transverse direction cannot be kept taut over time and hangs below the level of the guides (sagging) in which it is guided. This may be due to the relaxation in the guidance of the sunscreen in the guides and to the cloth itself or in combination with a lack of lateral tension in the flexible sunscreen. To solve this, a more robust type of guidance is required to enable a higher lateral tension in the cloth to keep the cloth taut over time. However such increase in lateral tension also influences the sunshade system pull or push force in a negative way which is undesirable. Such high pull or push forces may occur when the sunshade system is unwound or wound up onto the sunshade winding shaft. So there is a desire to ensure a higher lateral tension in the cloth with an acceptable level of pull and push forces.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

The sunshade system herein disclosed has each guiding strip made of thermoplastic material and comprises at least a second hinge part extending parallel to the first hinge part, longitudinally along the length of the guiding strip to form an opposite folding part centerline.

The thermoplastic material may be chosen such that its properties are matched with the properties of the guide channel in which the guiding strip is in slidable engagement. Once an optimal material is found, which performance is at an optimum in relation to the sliding performance and the NVH (Noise, Vibration and Harshness) performance, for each newly designed sunshade system the guiding strips may be used in the same material choice when the guide material or dimensions are not changed. This is beneficial since the guiding strips do not need to be tuned towards the guide with every new type of cloth material. The guiding strips may just be attached to the new type of flexible sunscreen material without any additional tuning work such as testing and changing materials.

Such a separate guiding strip is also beneficial from the aspect of buckling resistance, because the flexible sunscreen material itself does not have any buckling resistance. The guiding strip, when engaged between the walls of the sliding guide, may guide the flexible sunscreen in a buckling resistant way when the flexible sunscreen is wound upon the winding shaft.

An aspect of the invention are the hinge parts which are needed to fold the foldable parts in an acute angle with respect to the main part of the guiding strips and to unfold the foldable parts from an acute angle with respect to the main part of the guiding strips to a position in which the foldable parts substantially lie in the same plane as the main part of the guiding strips. Hinges which are made in plastic material and which are frequently folded and unfolded require a high flexural strength and a resistance to tearing (resistance to fatigue). The guiding strips are preferably made in a process named skiving, which is basically cutting of a guiding strip of a rotating solid disc of material with a sharp knife. The guiding strip is then provided with two parallel depressions forming the first and second hinge parts made by two pairs of opposite rotating depressing wheels. In this process forming two parallel depressions in the guiding strip, which are preferably on either side of, and more preferably symmetrically with respect to, a centerline of the guiding strip, it is avoided that the guiding strip is curved in a large radius which may happen when only one depression is made offset of the centerline of the guiding strip. It is beneficial to have a straight guiding strip which can be attached to a straight edge of the flexible sunscreen, such that once the guiding strip is attached to the flexible sunscreen material and the assembly is mounted in the guide channels, the result is a taut flexible sunscreen without any sagging nor any wrinkles. Two parallel depressions ensure that the guiding strip is provided with first and second hinge parts and that the guiding strip is straight. However, other measures could be taken to ensure straightness, for example by providing more than one second hinge at desired positions and/or with different depressions.

In another aspect of the invention is that the depressions of the first and the at least second hinge parts are made on opposite sides in the upper and lower surfaces of the guiding strip. This is to ensure that not only the depressions for the first and second guiding strip can be made in a symmetrical way with regard to the vertical centre line of the guiding strip but also with regard to a horizontal centerline of the guiding strip.

As an example depending on the material of the guide, in this example aluminium, the guiding strips are made of PA (polyamide) or PA+PTFE (polytetrafluoroethylene) or a combination with an equivalent material from the same group of materials.

It has been proved that such material is an optimum between low sliding forces (low coefficient of friction), a good NVH performance and its flexural strength. The low coefficient of friction contributes to the low pull and push forces generally influenced by the resistance of the sliding of the guiding strip in the guide chamber when the flexible sunscreen is moved in a longitudinal direction. The flexural strength contributes to the strength of the hinge, such that the hinges endure the continued folding and unfolding over time.

Preferably, an attachment between the guiding strip and the side edges of the main part of the flexible sunscreen is made in an area of the guiding strip between the first and the at least second hinge parts. This enables the strongest attachment between the guiding strip and the main part of the flexible sunscreen seen in a transverse direction. Obviously the attachment is made in an area of the sunshade system where it is not visible for the occupants in the vehicle. It is most beneficial when the packaging in the area allows an attachment made exactly at the centerline C of the guiding strip. In such a case the attachment when effected by stitching gives a very straight result of the stitching itself, whereas when stitched outside the centerline the stitch runs in a curve, which is not desirable. Nevertheless it is also conceivable that the attachment between the guiding strip and the side edges of the main part of the flexible sunscreen is made in the at least second hinge part. This would enable the attachment being made by for instance stitching to be partly or completely in the depression of the second hinge part and thus the total stacking thickness of the flexible sunscreen and the guiding strip including the attachment when rolled up onto the winding shaft would be less, measured in a radial direction. It is also conceivable that the attachment between guiding strip and the side edge of the main part is made between the inner edge of the guiding strip remote from the inwardly foldable part and the second hinge part. This choice may be made when the width of the guiding strip needs to be small and there is no other space left to make the attachment in the above-mentioned area.

Another aspect of the invention is that the guiding strips have a material thickness T1 in the range of about 0.2 mm to about 1 mm, or in particular in a range of about 0.25 mm to about 0.5 mm.

The thickness of the guiding strip must be such that it is flexible enough to be able to be wound up onto the winding shaft. However the guiding strip needs to have a certain amount of buckling resistance. This is required when the sunshade system is unwound and will be wound up onto the winding shaft. In such condition the guiding strip is loaded with a buckling force. In this condition the force is applied to the operating beam to wind the flexible sunscreen onto the winding shaft. Part of the sunshade system that facilitates the winding up of the flexible sunscreen is the inner spring inside the winding shaft which biases the winding shaft to wind up the flexible sunscreen. However since the packaging for the winding shaft is getting smaller in new developments for sunshade system in the automotive industry, the springs are getting smaller too, which means that the biasing force applied by the winding shaft is lower. Because the force to move the operating beam is applied by an electric motor via flexible cables or by manual applications (known in the art) it is of importance that this force is led via the guiding strips to the winding shaft to avoid that during winding-in of the flexible sunscreen, the sunscreen wrinkles or is not wound up at all. This can only be done when the guiding strips have a buckling resistance when the strips slide through the guide and are thus being loaded with a buckling force. To accommodate both the flexibility for winding up and the buckling resistance, the thickness of the guiding strip is set to the aforementioned ranges.

Another aspect of the invention is that the first and second hinge parts have a material thickness T2 in the range of about 0.05 to about 0.5 mm, and in particular in the range of about 0.1 to about 0.35 mm. The thickness of the first and second hinge part depends on the forces required to fold and unfold the guiding strips such that the hinge parts meet the requirements for endurance testing in that the hinges do not break over time. For this the tensile strength of the material is important and also it is important to avoid higher pull and push forces originating from folding and unfolding the inwardly foldable part, this may occur in case the hinge part is too thick.

Another aspect of the invention lies in the guiding strips having a width W1 in the range of about 10 mm to about 40 mm and in particular in the range of about 20 mm to about 30 mm and wherein the distance W2 between the first or second hinge part and a transverse edge of the guiding strip lies in the range of about 2.5 mm to about 10 mm and in particular in the range between about 4 mm and about 8 mm. The width of the guiding strip needs to be basically twice the width that is functionally required for the function of the guiding strip on one lateral edge of the sunshade system. The reason for this is explained above. Although strictly the guiding strip may be wider than necessary when observing one side of the flexible sunscreen, the excess of width and the additional unused hinge may be used for placing the attachment between guiding strip and flexible sunscreen in a position which may be dictated by the available packaging and/or by the position that the head liner has relative to the guides. So this could mean that upon these considerations the attachment lies more towards the first hinge part or lies more towards the second hinge part or even in or beyond the second hinge part towards the edge of the guiding strip.

In another aspect of the invention, the width W3 of the depression of the first and second hinge part, along a part having a substantially constant thickness T2 lies in the range of about 0.3 to about 2 mm, and in particular in the range of about 0.35 to about 1 mm.

The width W3 shall be selected such that an optimal hinge function is guaranteed and depends on the thickness of the guiding strip. A thicker guiding strip requires a longer hinge width W3 because the foldable part is folded in an acute angle and the hinge needs to be long enough to let the foldable part be folded freely without interference towards the main part of the guiding strip. The width W3 may not be chosen too long since in case it is too long the foldable part will not be able to have enough support from the main part of the guiding strip when an excessive lateral force is applied whereby the first hinge part will act as a sort of spring in lateral direction.

In another embodiment the guiding strip is equipped with a reinforcement. This reinforcement may be required to improve the buckling resistance of the guiding strip in such case that the buckling resistance of the basic application of the guiding strip is not enough. This can be done by adding to the guiding strip a separate stiffer part, for instance a thin steel strip, or it may be conceivable that the guiding strip is made of two different thermoplastic materials, whereby the second material has a higher E modulus than the basic material of the guiding strip.

Another aspect of the invention is that the guiding strips have an attachment to the upper side of the main part of the flexible sunscreen by stitching, gluing, welding, or a clamping method using heat. Preferably the attachment is made by stitching since this involves the least of investments compared to the other possibilities such as welding, gluing, welding or clamping under influence of heat.

In another aspect of the invention, the guiding strip is connected to the operating beam by a pocket formed by the guiding strip, around a connection bar which is mounted in the operating beam. In this way the guiding strip is connected via the connection bar and the operating beam with the drive cables and the driving means (electric motor) (known in the art). In this way the buckling forces can be directly applied from the operating beam to the guiding strips.

In another embodiment the pocket is reinforced by a pocket pilot for increasing buckling resistance of the guiding strip, the pocket pilot being attached to the operating beam. The pilot will press the pocket of the guiding strip in a downward direction such that when a buckling force is applied on the guiding strip the pilot avoids that the connection bar would freely move inside the pocket without taking along the guiding strip inside the guide.

Such guiding strip is made with a method of manufacturing guiding strips for use in a sunshade system in a vehicle roof assembly, comprising the steps of
  providing a disc of thermoplastic solid material on a rotatable axis, wherein the disc of material is capable of rotating around the axis,
  cutting a layer of the disc by a sharp knife while the disc is rotating, the layer having substantially the thickness of a guiding strip,
  rolling the layer through a first pair of opposite rotating rollers to provide a pre-treatment wherein the pre-treatment is compression (for stretching and straitening of the strip) of the guiding strip,
  rolling the layer through a heating device to provide the guiding strip with a pre-treatment, wherein the pre-treatment is heating up the layer to a temperature in the range of between about 110 to about 260° C. and in particular in the range of about 120 and about 170° C.
  rolling the layer through at least one second pair of opposite rotating rollers to provide the layer with depressions ultimately forming the first and second hinge parts,
  gradually folding at least one of foldable parts into an acute angle with the main part of the guiding strip along a length of the guiding strip and gradually unfolding the at least one of foldable parts into the plane of the main part of the guiding strip,
  cooling down the guiding strip in a cooling unit to room temperature.

Thus such guiding strip is made in a first step of the process from a disc of solid material of which the molecules are oriented in random directions in contrast to a guiding strip that would have been made in an extrusion process, whereby the majority of the molecules lie in a longitudinal extrusion direction. Such discs may be made in a compression moulding process. The side guiding strip is created by firstly cutting off a layer of the rotating disc. The layer is further processed through the next steps to become a side guiding strip at the end of the process. In a second step of the process the layer is led through a pair of opposite rolling rollers having a particular shape and distance towards each other such that the layer is compressed and straightened and that at the end of the process sequence a straight and or stretched guiding strip is manufactured. In a subsequent step of the process the layer is led through a heating device, whereby the layer is heated to a temperature whereby the molecules in the material become stretchable. This heating up is meant for the next step in the process, the rolling of depressions in the guiding strip that will form the foldable hinges at the end of the process. The heating temperature should be in a range such that molecules may be stretched into a direction substantially perpendicular to the longitudinal directions of the first and second hinges during the step of rolling in the depressions in the layer.

In a subsequent step the layer which is heated up is led through at least one, but preferably two or more sets of opposite rotating rollers. Although it is conceivable that the depressions and therewith the hinges are created by one set of rollers, nevertheless preferably the depressions are gradually deepened in phases in the material of the layer, in that each of the several pairs of rollers contribute to the total depth of the depressions. By gradually deepening the depressions the molecules are stretched in transverse direction of the layer, which contributes to the strength of the hinge.

In a subsequent step the layer which has now the first and second hinge parts and can be referred to as guiding strip is subjected to an operation whereby the foldable parts are gradually folded into an acute angle with the main part of the guiding strip. This operation is done gradually by moving the guiding strip over a laterally placed wall curved in length direction and shaped like a tunnel. Each particular part of the foldable parts of the guiding strip is, while being moved over the tunnel wall, gradually folded into an acute angle. This operation creates an operating direction for the hinges. So once connected to the flexible sunscreen and functional in the sunshade system the foldable parts are subjected to folding into the same acute angle. After folding of the foldable parts in an acute angle the foldable parts are folded back into a flat position whereby the foldable parts are substantially in the same plane as the main part of the guiding strip.

This pre-folding of the folding parts is beneficial for the endurance of the hinges. In practice such sunshade system will be wound up and rolled off multiple times under various dynamic conditions, in which it is subjected to varying temperatures, varying humidity, and vibrations of different frequencies and intensities. So under such circumstances the first or the second hinge part will be subjected to multiple folding and unfolding conditions.

The guiding strips are made of a material and made in a process that enables the hinges in the guiding strip that may withstand these conditions without tearing and thus without the inwardly folding part breaking off of the main part of the guiding strip whereby the lateral tension in the flexible sunscreen would be severely reduced.

The first and second hinge part are pressed into the guiding strip parallel to each other, symmetrically with regard to a centerline through the middle of the guiding strip and with a certain distance to the edge of the guiding strip. The reason for creating two parallel hinge parts lies in the fact that when only one hinge part would be pressed in the guiding strip, off set of the centerline of the guiding strip, the guiding strip would have the tendency to be manufactured in a curved shape. A straight guiding strip is very important to be able to produce a sunshade system which in build in situation does not provide any wrinkles in the flexible sunscreen. In the last process step the guiding strip is cooled down quickly in order to "freeze" the molecules in the first and second hinge parts.

Another aspect of the invention is a method of manufacturing a flexible sunscreen of a sunshade system for use in a vehicle roof assembly, comprising the steps of:
- aligning a first length of side guiding strip from a feed of the guiding strip, on a sewing table of a stitching machine,
- aligning a lateral side edge of a pre-cut flexible sunscreen on top the first guiding strip,
- clamping the stacked guiding strip and flexible sunscreen in a clamping fixture,
- attaching of the first guiding strip to the flexible sunscreen by an attachment made by one of the following connecting methods of stitching, gluing, welding, or clamping method using heat,
- cutting off of the loose guiding strip of the feed of the guiding strip from the already attached guiding strip substantially near the longitudinal end of the flexible sunscreen,
- pulling the attached first guiding strip with the flexible sunscreen from the sewing table,
- aligning of second guiding strip from a feed of the guiding strip onto the sewing table,
- aligning of the flexible sunscreen with the attached first guiding strip with its opposite lateral side edge onto the second guiding strip,
- clamping of the guiding strip and flexible sunscreen in a clamping fixture,
- attaching of second guiding strip to the flexible sunscreen by an attachment made by one of the following connecting methods of stitching, gluing, welding, or clamping method using heat,
- cutting off of the loose guiding strip of the feed of the guiding strip from the already attached guiding strip and stitching wire substantially near the end of the longitudinal edge of the flexible sunscreen.

It is also conceivable that as an alternative process the first two steps are swopped. In that case first the flexible sunscreen material is applied on the sewing table and in a second step the guiding strip is applied on top of the flexible sunscreen material.

It is important in this process in order to have a straight stitch line along the edge of the flexible sunscreen material, to have a stable guiding strip which is straight and that the stitching of the guiding strip is applied near the centerline of the guiding strip, to avoid that the stitching line becomes arc shaped instead of a straight line.

BRIEF DESCRIPTION OF THE DRAWINGS

Hereinafter aspects of the invention will be elucidated while referring to the drawing, in which:

FIGS. 3a, 3b and 3c show a partial sectional view along lines III-III FIG. 2 on a larger scale, and in 3 different versions of attachment of the guiding strips.

FIG. 4a shows a sectional view of a guiding strip in unfolded straight position.

FIG. 4b shows a detail from FIG. 4a.

FIG. 5 shows a sectional view of the guiding strip comprising a reinforcement.

FIG. 6 shows a sectional view of the guiding strip of an embodiment having a reinforcement attached to it.

FIG. 8 shows a sectional view along line VIII-VIII in FIG. 7

FIG. 9 shows a sectional view along line IX-IX in FIG. 7.

FIG. 10 shows a partial schematic perspective view of the sunshade system showing details of the fixing of the guiding strip to the operating beam.

FIG. 11 shows a sectional view along line XI-XI in FIG. 10.

FIG. 12 shows a partial sectional view along line XII-XII in FIG. 10.

DETAILED DESCRIPTION

Figure 1:
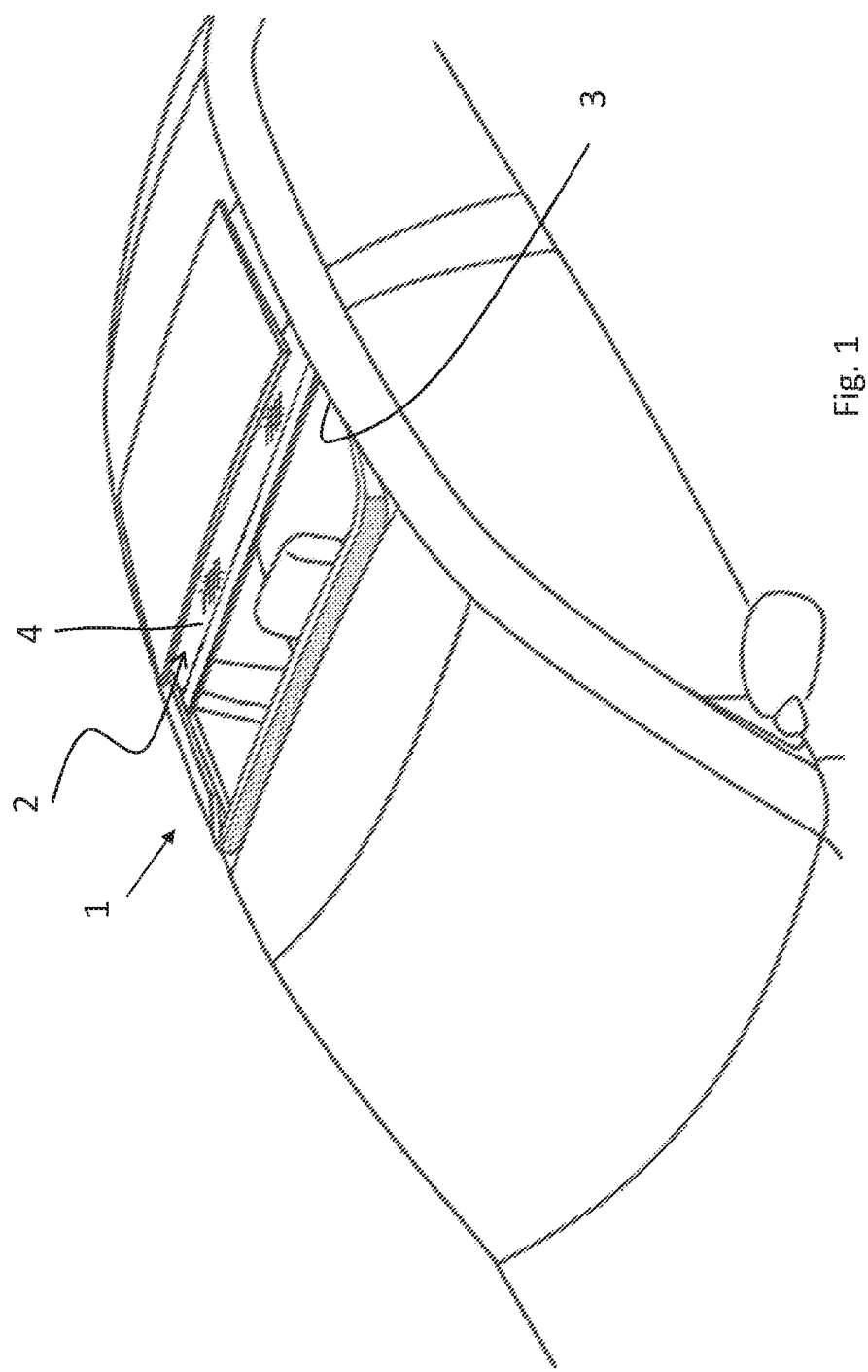
FIG. 1 shows in a schematic and perspective view a vehicle roof assembly and a sunshade system.
Figure 2:
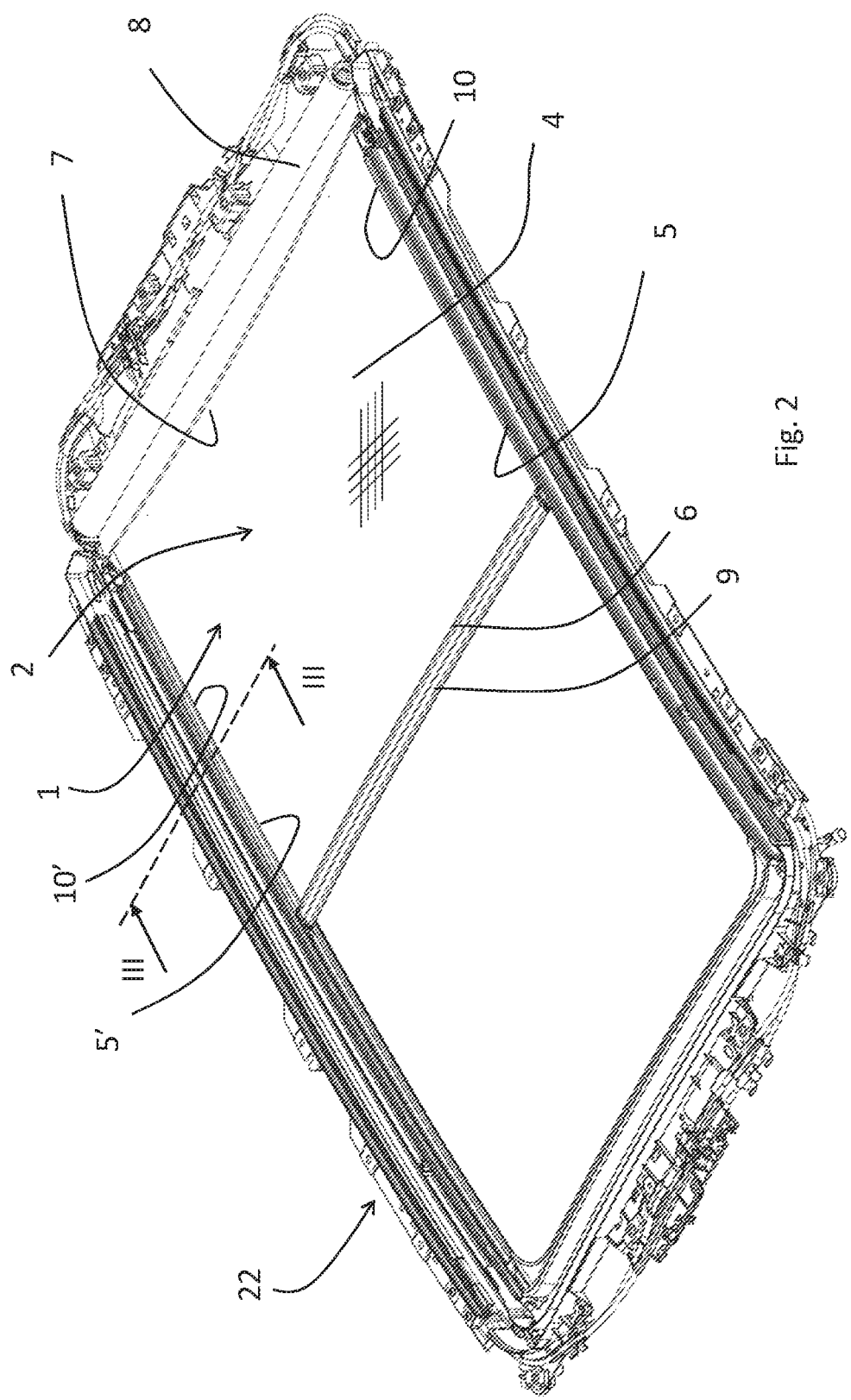
FIG. 2 shows in a perspective view a frame part of the vehicle roof assembly and a sunshade system.

Firstly referring to FIGS. 1 and 2 an example is illustrated of a vehicle roof assembly. Such vehicle roof system may be a so called top slider system, a spoiler roof system or a tilt/vent slider system. The panel of the vehicle roof assembly is capable of being opened and being closed. Below the vehicle roof assembly a sunshade system 1 is placed comprising a flexible sunscreen 2 capable of covering an opening 3 below the vehicle roof assembly and capable of revealing the opening 3 below the vehicle roof assembly by winding up the flexible sunscreen 2 on a winding shaft 8. The winding shaft is usually placed along the transverse rear end of the opening 3 below the vehicle roof assembly, but it is also feasible that the winding shaft 8 is placed transversely in the centre area or at the transverse front edge of the opening 3 below the vehicle roof assembly. The flexible sunscreen 2 comprises a main part 4A and along the longitudinal edges of the main part 4, side edges 5, 5', and further transverse edges such as a leading edge 6 and a trailing edge 7.

The sunshade system 1 further comprises guides 14, 14' (FIG. 3) that are placed in the lateral side areas of the opening 3 below the vehicle roof assembly. As a matter of fact the guides 14, 14' for the sunshade system 1 may be part of a stationary part or frame 22 of the vehicle roof assembly as shown in FIG. 2. Guides 14, 14' extend in a longitudinal direction of the vehicle and comprise channels for guiding side edges 5, 5' of the flexible sunscreen 2.

Figure 3A:
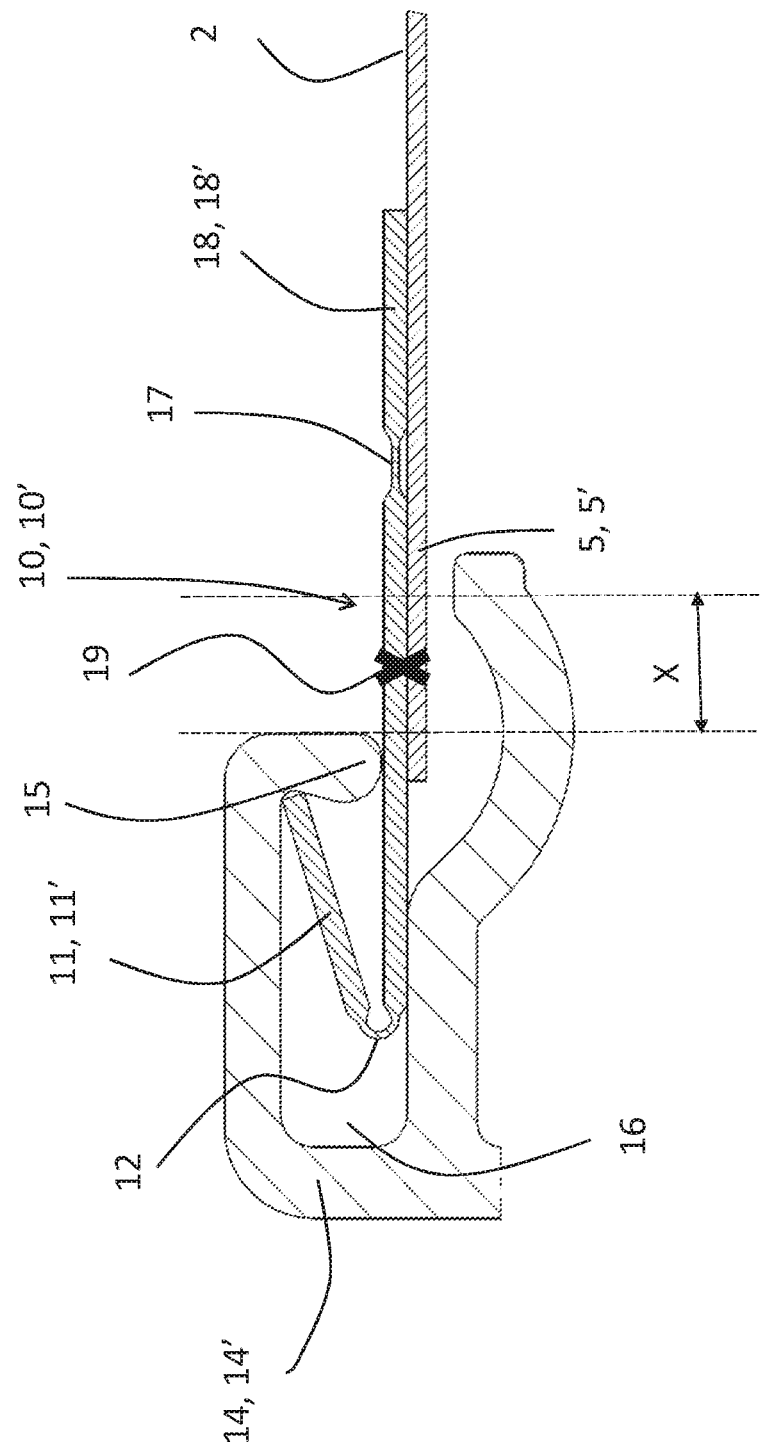
Figure 3B:
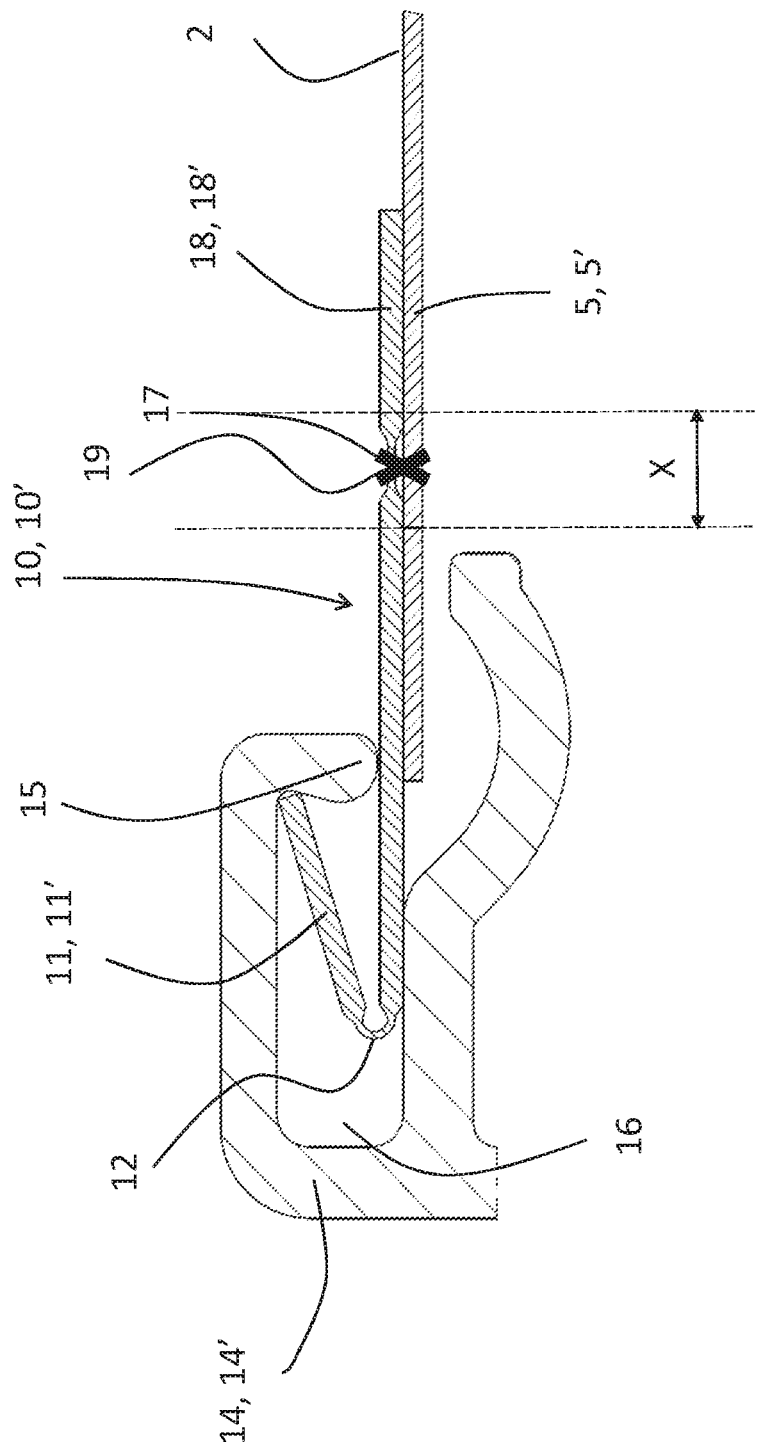

In FIG. 3a-c a part of a guide 14, 14' is shown being guide chamber 16. The lateral edges 5, 5' of the flexible sunscreen 2 are shown which are connected to side guiding strips 10, 10'. The connection is shown by a cross of attachment 19 in FIG. 3 and can be any of a stitched, glued or welded connection. The guiding strips 10, 10' comprise a foldable part 11, 11' at the lateral outer side of each guiding strip 10, 10' and a foldable part 18, 18' at the lateral inner side thereof. The foldable parts 11, 11' and 18, 18' are connected to a middle or main part of the guiding strips 10, 10' by a flexible hinge part 12, 17, respectively such that the strip has a symmetrical shape with respect to a longitudinal centerline of the strip 10, 10'.

An attachment 19 to the sunscreen 2 is made in such a way that it is positioned in an area indicated in FIG. 3*a* having a width X along the complete longitudinal length of the guiding strip 10, 10'. However, preferably, the attachment 19 is made along the centerline C (FIG. 4*a*) of the guiding strip 10, 10' such that when the attachment 19 is made between guiding strips 10, 10' and flexible sunscreen 2 the attachment 19 is made in a straight line. As can be seen from FIG. 3, only the foldable part 11, 11' is folded to an acute angle and placed in the guide chamber 16 of the guides 14, 14'. The outer end of the foldable part 11, 11' hooks behind a locking member 15 in the guide 14, 14'. Since each of the guiding strips 10, 10' are connected to opposite lateral edges 5, 5' of the flexible sunscreen 2 and are placed in opposite guide chambers 16, it is possible to create a transverse tension in the flexible sunscreen 2 such that the sunscreen 2 appears to be taut between the guides 14, 14'. The foldable part 18, 18' does not fold during use of the sunscreen 2 and is particularly formed for manufacturing purposes.

FIG. 3*b* shows an alternative position of the attachment 19, i.e. within the second hinge part 17, where the stitch or other attachment can be made within the thickness of the guiding strip 10, 10'.

In the FIG. 3*c* embodiment, the attachment 19 is positioned even beyond the second hinge 17, which could be useful in case of narrow guiding strips 10, 10'.

In FIGS. 4*a* and 4*b*, the guiding strip is shown in an unfolded manner, whereby both first and second hinge parts 12, 17 are shown which are depressions 13, 13' made on both upper and lower sides of the guiding strips 10, 10', such that the strip 10, 10' also has a shape which is symmetrical with respect to a horizontal centerline of the strip 10, 10'(not shown). In these figures also the definition of the lengths W1, W2 and W3 and thicknesses T1 and T2 as used in the claims are clarified.

In FIGS. 5 and 6, embodiments are shown whereby the guiding strips 10, 10' are equipped with additional reinforcements 24, 25. In FIG. 5 the additional reinforcement 24 is integrated into the material of the guiding strips 10, 10'. It is conceivable that the basic material from which the guiding strips 10, 10' are made, is a 2K material, whereby the foldable parts 11, 11', 18, 18' and hinges 12, 17 are of a first material having a first E-modulus and the main part of the guiding strips 10, 10' comprises a second material having a second higher E-modulus. It is conceivable that such a reinforcement can also be added as a separate reinforcement 25 to the guiding strips 10, 10' such as shown in FIG. 6.

Figure 7:
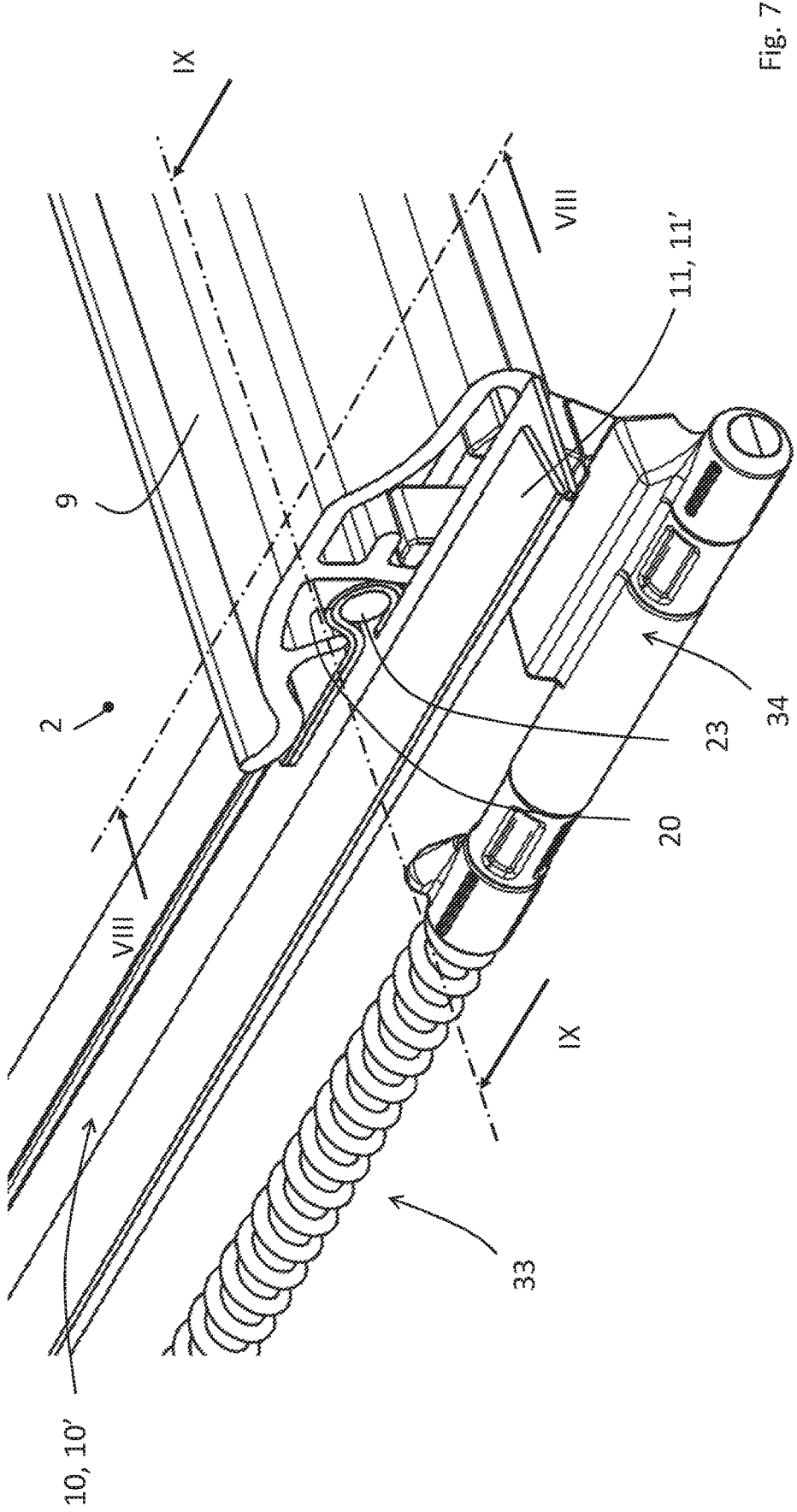
FIG. 7 shows a partial schematic perspective view of the sunshade system showing details of the fixing of the guiding strip to the operating beam.

In FIGS. 7, 8 and 9 the guiding strips 10, 10' and the connection of the guiding strips 10, 10' to the operating beam 9 are shown. Adjacent to the operating beam 9, the guiding strips 10, 10' are cut in a longitudinal direction, whereby the inner part of the guiding strips 10, 10' is folded together with the flexible sunscreen 2 around a connection bar 23. The connection bar 23 extends along the length of the operating beam 9 and is locked inside the operating beam 9 by the inner shape of the operating beam 9. A front portion of the sunscreen 2 is formed into a pocket 20 folded around the connection bar 23 to connect the sunscreen 2 directly to the operating beam 9. Thus the connection bar 23 and consequently the sunscreen 2 move together with the operating beam 9. The operating beam 9 is driven by a drive unit comprising a DC electric motor and a flexible drive cable 33 (known per se). At the end of the drive cable 33 a drive cable plate 34 is connected which is directly connected with the operating beam 9. For clarity in FIG. 7, the guides 14, 14' are omitted to show the guiding strips 10, 10' and the drive cable connection. In FIGS. 8 and 9 the guides 14, 14' are added to show the relation between operating beam 9, guiding strips 10, 10' and guides 14, 14'.

FIGS. 10, 11 and 12 show another embodiment whereby a pilot 21 is shown connected to the operating beam. Pilot 21 further holds the connection bar 23 around which the flexible sunscreen 2 and the guiding strips 10, 10' are folded such as can be seen in FIG. 12. The pilot 21 puts pressure to the pocket 20 such that in case the flexible sunscreen 2 is wound up onto the winding shaft 8 and a buckling force is applied from the operating beam 9 via the guiding strips 10, 10' towards the winding shaft 8, the pilot 21 avoids that the connection bar 23 would freely move inside the pocket 20 without taking along the guiding strip 10, 10' inside the guide 14, 14'. For clarity the guide 14, 14' is omitted from FIG. 10 to have a better view of the guiding strips 10, 10' and the pilot 21. In FIG. 11 the guide 14, 14' has been added to show the relationship between the pilot 21 and the guides 14, 14'.

Figure 13:
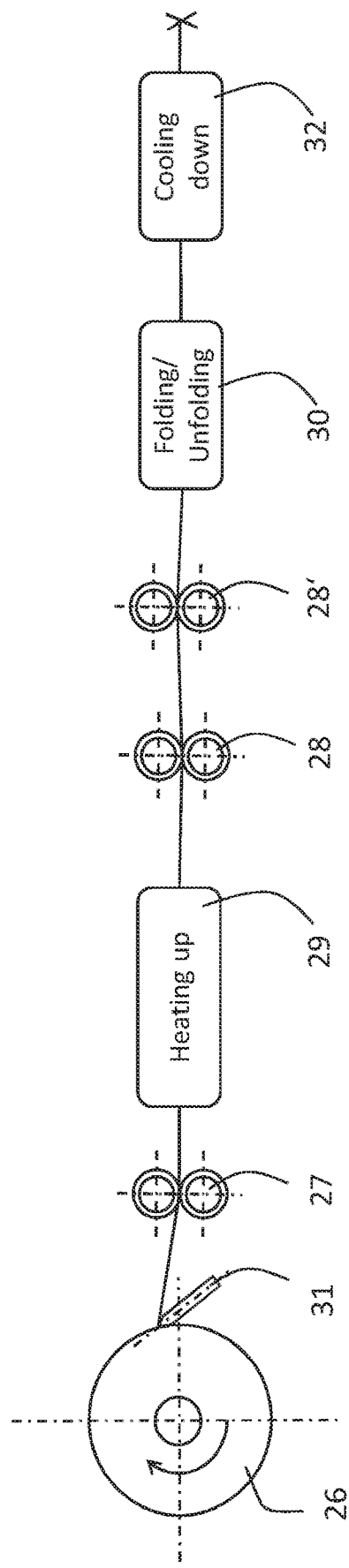
FIG. 13 shows a schematic view of a method of manufacturing guiding strips.

FIG. 13 shows a schematic view of a method for manufacturing the guiding strips comprising the steps of:
  providing a disc 26 of thermoplastic solid material on a rotatable axis, wherein the disc 26 of material is capable of rotating around the axis,
  cutting a layer of the disc 26 by a sharp knife 31 while the disc 26 is rotating, the layer having substantially the thickness of a guiding strip 10, 10',
  rolling the layer through a first pair of opposite rotating rollers 27 to provide a pre-treatment wherein the pre-treatment is compression of the strip,
  rolling the layer through a heating device 29 to provide the strip with a pre-treatment, wherein the pre-treatment is heating up the layer to a temperature in the range of between about 110 to about 260 degrees C.
  rolling the layer through at least one second pair of opposite rotating rollers 28, 28' to provide the layer with depressions 13, 13' ultimately forming the first and second hinge parts 12, 17 (FIG. 4*a*, 4*b*),
  gradually folding 30 at least one of foldable parts 11, 11' into an acute angle with the remainder of the guiding strip 10, 10' along a length of the guiding strip and gradually unfolding 30 the at least one of foldable parts 11, 11' into the plane of the main part of the guiding strip 10, 10'
  cooling down the guiding strip 10, 10' in a cooling unit 32 to room temperature.

The invention is not limited to the embodiments described before which may be varied widely within the scope of the invention as defined by the appending claims. For instance it may be conceivable that, when the accuracy requirements for straightness of the guiding strips 10, 10' are lower, the guiding strips 10, 10', after manufacturing of the guiding strips 10, 10', are cut in longitudinal direction along the centerline of the guiding strips 10, 10' so as to use each of the guiding strips 10, 10' at a lateral edge of the sunscreen. Also it may be conceivable that the foldable parts 11, 11' of the guiding strips 10, 10' are stored on the winding shaft 8 in an inwardly folded manner or in an unfolded, straight manner.

The invention claimed is:
1. A sunshade system for use in a vehicle roof assembly, capable of opening or at least partly closing an opening below the vehicle roof assembly, said sunshade system comprising:

a flexible sunscreen having at least a main part with two opposite lateral side edges, a leading edge and a trailing edge, a winding shaft for winding and unwinding the flexible sunscreen at its trailing edge, an operating beam attached to the leading edge of the flexible sunscreen, guiding strips laterally extending along, and attached to, each of lateral side edges of the main part and each of the guiding strips comprising:
- an inwardly foldable part capable of being folded inwardly towards a longitudinal centerline of the sunshade system in an acute angle with a middle part of each of the guiding strips and being folded flat in the same plane as the middle part when the flexible sunscreen is wound up onto the winding shaft, and
- a first hinge part extending in longitudinal direction of said strip,
- whereby the first hinge part is formed as a depression made in the guiding strips, and
- whereby each inwardly foldable part is connected to a remainder of the guiding strip by said first hinge part, and two opposed longitudinal guides for retaining therein in a transverse direction and slidably guiding therein in a longitudinal direction, at least the inwardly foldable parts, and at least a part of the middle part of the guiding strips, said guides being provided with locking members and with guide chambers for engaging at least the inwardly foldable parts of the flexible sunscreen for preventing said inwardly foldable parts from laterally moving out of the associated guide chamber of the longitudinal guides when the flexible sunscreen is at least partly unwound, wherein each guiding strip is made of thermoplastic material and comprises at least a second hinge part extending parallel to the first hinge part, longitudinally along a length of the guiding strip to form an opposite foldable part, and wherein when each inwardly foldable part and each first hinge are disposed in the associated guide chamber to move with sliding, movement of each inwardly foldable part, each second hinge is in an unfolded state.

2. The sunshade system according to claim 1, wherein each first hinge part and each at least second hinge part are arranged on either side of a longitudinal centerline in the middle of each guiding strip.

3. The sunshade system according to claim 2, wherein each first hinge part and each at least second hinge part are positioned symmetrically relative to the longitudinal centerline in the middle of each guiding strip.

4. The sunshade system according to claim 1, wherein an attachment between the guiding strips and the side edges of the main part of the flexible sunscreen is made in the middle part of the guiding strips between each first and each at least second hinge part.

5. The sunshade system according to claim 1, wherein the attachment between the guiding strips and the side edges of the main part of the flexible sunscreen is made in each at least second hinge part.

6. The sunshade system according to claim 1, wherein the attachment between the guiding strips and the side edges of the main part of the flexible sunscreen is made in an area of the guiding strips inwardly beyond each at least second hinge part.

7. The sunshade system according to claim 1, wherein the guiding strips are made of PA or PA+PTFE.

8. The sunshade system according to claim 1, wherein the guiding strips have a material thickness $T1$ in the range of about 0.2 mm to about 1 mm.

9. The sunshade system according to claim 1, wherein the guiding strips have a width $W1$ in a range of about 10 mm to about 40 mm, and wherein a distance between each first or second hinge part and a transverse edge of each guiding strip $W2$ lies in the range of about 2.5 mm to about 10 mm.

10. The sunshade system according to claim 1, wherein the first and second hinge parts have a material thickness $T2$ of in the range of about 0.05 to about 0.5 mm.

11. The sunshade system according to claim 10, wherein a width $W3$ of the depression of the first and second hinge parts where the material thickness $T2$ is substantially constant is in the range of about 0.3 to about 2 mm.

12. The sunshade system according to claim 1, wherein each guiding strip is equipped with a reinforcement.

13. The sunshade system according to claim 1, wherein the guiding strips have an attachment to an upper side of the main part of the flexible sunscreen by one of stitching, gluing, welding, and a clamping method using heat.

14. The sunshade system according to claim 1, wherein each guiding strip is connected to the operating beam by a pocket formed by each guiding strip, around a connection bar which is mounted in the operating beam.

15. The sunshade system according to claim 14, wherein the pocket is reinforced by a pocket pilot for increasing buckling resistance of the guiding strip, the pocket pilot being attached to the operating beam.

16. A sunshade system for use in a vehicle roof assembly, capable of opening or at least partly closing an opening below the vehicle roof assembly, said sunshade system comprising:

a flexible sunscreen having at least a main part with two opposite lateral side edges, a leading edge and a trailing edge, a winding shaft for winding and unwinding the flexible sunscreen at its trailing edge, an operating beam attached to the leading edge of the flexible sunscreen, guiding strips laterally extending along, and attached to, each of lateral side edges of the main part and each of the guiding strips comprising:
- an inwardly foldable part capable of being folded inwardly towards a longitudinal centerline of the sunshade system in an acute angle with a middle part of each of the guiding strips and being folded flat in the same plane as the middle part when the flexible sunscreen is wound up onto the winding shaft, and
- a first hinge part extending in longitudinal direction of said strip,
- whereby the first hinge part is formed as a depression made in the guiding strips, and
- whereby each inwardly foldable part is connected to a remainder of the guiding strip by said first hinge part, and two opposed longitudinal guides for retaining therein in a transverse direction and slidably guiding therein in a longitudinal direction, at least the inwardly foldable parts, and at least a part of the middle part of the guiding strips, said guides being provided with locking members and with guide chambers for engaging at least the inwardly foldable parts of the flexible sunscreen for preventing said inwardly foldable parts from laterally moving out of the associated guide chamber of the longitudinal guides when the flexible sunscreen is at least partly unwound, wherein each guiding strip is made of thermoplastic material and comprises at least a second hinge part extending parallel to the first hinge part, longitudinally along a length of the guiding strip to form an opposite foldable part, wherein when each first hinge part is disposed in the associated guide chamber to move with sliding movement of each inwardly foldable part, wherein each second hinge part is in an unfolded state and disposed outside and spaced apart from the associated guide chamber.

* * * * *